W. BARBER.
TRACTION MACHINE.
APPLICATION FILED FEB. 9, 1915.
1,153,538.
Patented Sept. 14, 1915.
2 SHEETS—SHEET 1.
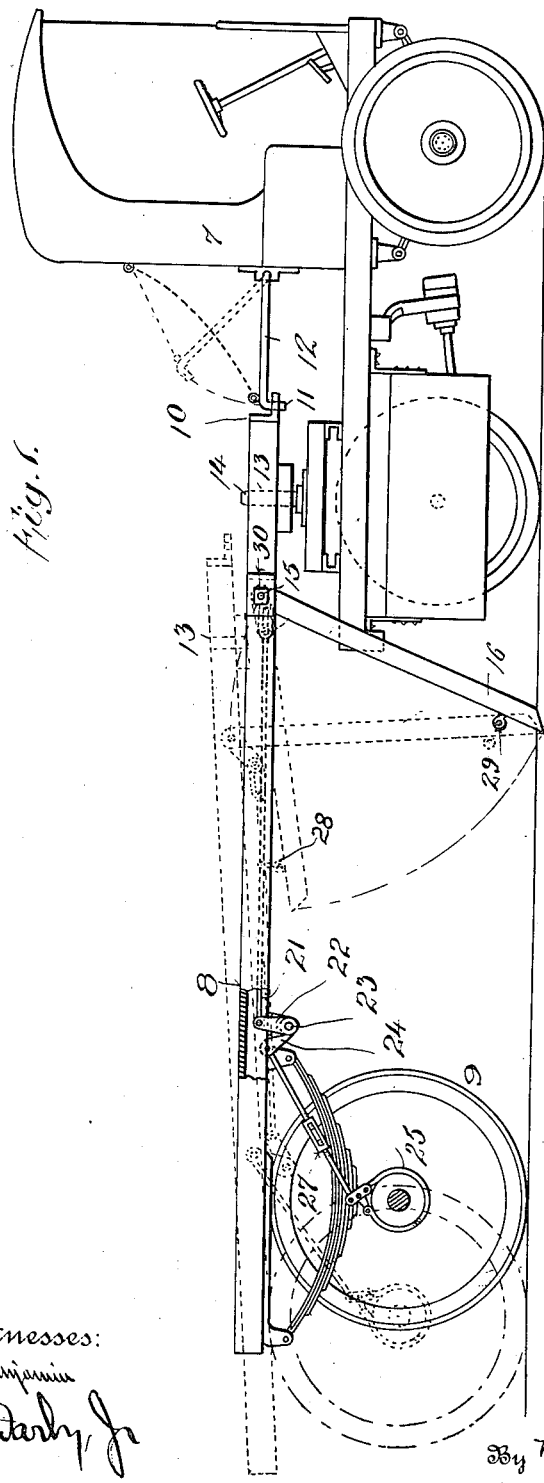
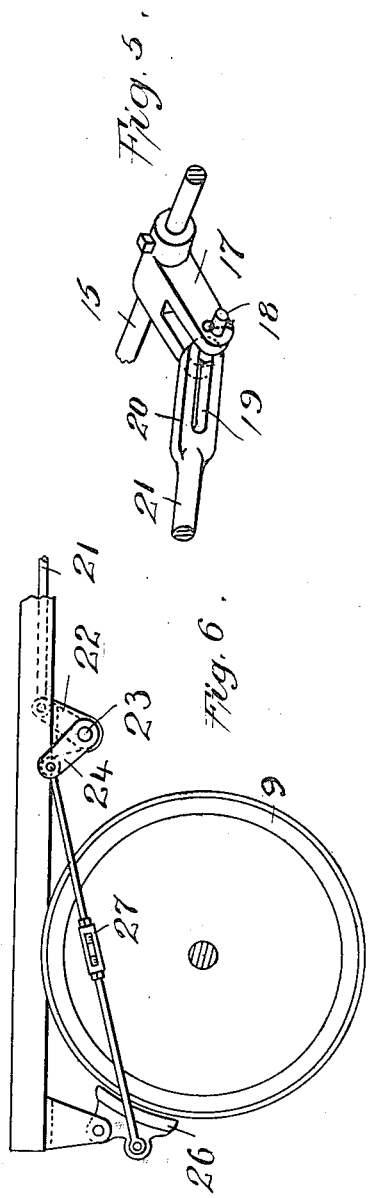
Witnesses:
Inventor
William Barber
By his Attorney
Samuel E. Darby

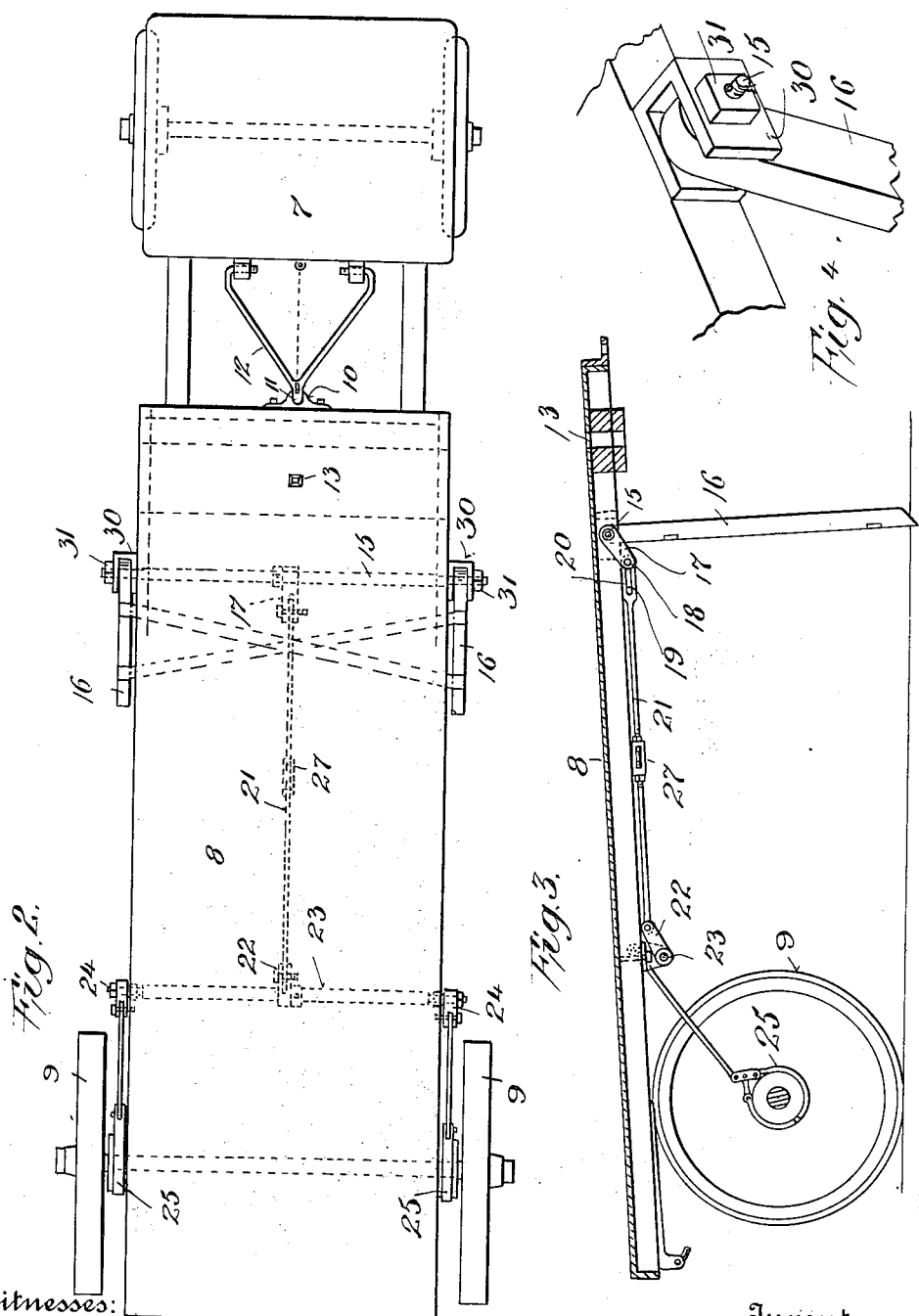

UNITED STATES PATENT OFFICE.

WILLIAM BARBER, OF BROOKLYN, NEW YORK.

TRACTION-MACHINE.

1,153,538.  Specification of Letters Patent.  Patented Sept. 14, 1915.

Application filed February 9, 1915. Serial No. 7,133.

*To all whom it may concern:*

Be it known that I, WILLIAM BARBER, a citizen of the United States, residing at Brooklyn, in the county of Kings, State of New York, have made a certain new and useful Invention in Traction-Machines, of which the following is a specification.

This invention relates to traction machines.

The object of the invention is to provide a traction machine which is simple in construction and wherein a power driven tractor is employed to which a trailer is detachably connected.

A further object of the invention is to provide means in a traction machine of the nature referred to whereby the trailer is automatically detached from the tractor.

A further object of the invention is to provide means for coincidently detaching the trailer from the tractor and applying the brakes to the trailer.

A further object is to provide means in a traction machine of the nature referred to whereby a trailer may be readily attached to the tractor.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings: Figure 1 is a view in side elevation of a traction machine embodying the principles of my invention, and showing a trailer coupled to the tractor. Fig. 2 is a top plan view of the same. Fig. 3 is a view in vertical longitudinal section showing a trailer detached from the tractor. Fig. 4 is a broken detail view in perspective showing an arrangement for connecting the swinging arms employed in automatically detaching the trailer from the tractor. Fig. 5 is a view similar to Fig. 4, showing an arrangement of connection employed to apply the brakes to the trailer coincidently with its detachment from the tractor. Fig. 6 is a broken view showing a modified form of brake mechanism.

The same part is designated by the same reference numeral wherever it occurs throughout the several views.

In carrying out my invention I employ a power driven tractor or motor truck which may be of any suitable, convenient or well known construction and to which, in accordance with my invention, a trailer is detachably connected, and I provide means whereby, by backing up the motor truck or tractor the trailer will be automatically detached therefrom, and the brakes applied on the trailer. I also provide means whereby a trailer may be easily and quickly connected to the tractor.

I wish it to be understood that by the use of the term tractor I include any form of truck, and as an exemplification I have shown a motor truck 7, which may be operated and controlled in the usual or any convenient manner.

The trailer is indicated generally by reference numeral 8. At its rear end the trailer is supported on wheels 9. At its front end the trailer is provided with a casting or member 10, with which engages the hooked end 11 of a bail or strap 12, hinged upon the tractor. Near its front end the trailer is provided with a socket or opening 13, in which is received a pin or stud 14, carried at the rear of the tractor, and which extends vertically upward. This stud or pin 14 when engaged in the socket or opening 13 of the trailer constitutes a readily detachable connection by which the trailer is held to the tractor. In order to detach the trailer from the tractor it is only necessary to detach the bail or strap 12 from its engagement with the member 10, and then raise the front end of the trailer sufficiently to clear the stud or pin 14 from its engagement in the socket 13.

In the practical use of motor trucks in handling loads of freight or other material, it is frequently desirable to haul the truck into convenient position to be loaded or unloaded. While the loading or unloading operation is being accomplished the motive power of the truck remains idle. This involves loss of time, delay and expense, and it is among the special purposes of my invention to provide a trailer designed to be readily and easily connected to and detached from a tractor, and means to automatically effect the detachment of the trailer from the tractor and apply the brakes on the trailer, thereby enabling a tractor to haul a trailer into position to be loaded or unloaded and then detach it from the tractor, and while the loading or unloading operations are being carried on the tractor may be employed to haul another empty or loaded trailer into proper position to be loaded or unloaded, or for any other purpose for which it is adapted.

In order to accomplish the automatic detachment of a trailer from the tractor, I provide, in one form of embodiment of my invention, the following construction: Near the front end of the trailer I journal a rock shaft 15, which is arranged to extend transversely across the frame of the trailer, and preferably beneath the same. Upon the ends of this shaft which extend beyond the sides of the trailer frame I mount arms 16, to rock with said shaft. Also mounted on shaft 15, to rock therewith is a crank arm 17, having a pin 18, which engages in a slot 19 in a head 20, at the forward end of a rod 21, which is connected at its rear end to a crank arm 22, on a rock shaft 23, which extends transversely across the frame of the trailer and preferably underneath the same, and which has crank arms 24, suitably connected to the brake band or strap 25, where that form of brake is employed (see Figs. 1, 2, and 3) or to the brake shoe 26, as shown in Fig. 6. Provision is made for adjustment of the brake applying connections. Such adjustment is afforded by the turn buckles 27.

In practice when the trailer is properly connected to the tractor the arms 16 are rocked upwardly against the underside of the trailer frame, as indicated in dotted lines at 28 in Fig. 1, and are retained in this position in any convenient manner, as, for instance, by means of hooks engaging in eyes 29 on said arms. In this condition the stud or pin 14 is engaged in the socket 13, and the hooked end 11 of the strap or bail 12 is engaged with the member 10. The tractor may now haul the trailer, whether loaded or not to any desired point, the rear end of the trailer being supported on its wheels 9, while the front end thereof is supported on the tractor. If now, it be desired to detach the trailer from the tractor, the arms 16 are released from the position shown in dotted lines at 28, Fig. 1, and their free ends are rocked down into engagement with the ground, as shown in full lines in Fig. 1. This movement causes shaft 15 to rock, thereby moving the brake straps 25, or shoes 26, as the case may be, toward, but not quite into, applied position. The bail or strap 12 is disengaged from the member 10, and the tractor is then backed toward the trailer. This operation causes the free ends of the arms 16 to dig into the ground and as the backing of the tractor continues the arms fulcrum about their free ends thereby raising the front end of the trailer into the position shown in dotted lines in Fig. 1, and hence lifting the same out of engagement with the pin or stud 14.

The tractor is now free from the trailer and may proceed to other duties leaving the trailer supported at its front end upon the arms 16, as shown in Fig. 3. The movement of the arms 16 from their position shown in full lines in Fig. 1 into their substantially vertical position shown in dotted lines in Fig. 1, and in full lines in Fig. 3, causes a further axial rotation of shaft 15, and a consequent final application of the brakes and hence the trailer, when detached from the tractor is maintained with its brakes applied. In order to again attach the trailer to the tractor all that is required is to back up the tractor until the bail or strap 12 can be engaged with the member 10. The tractor is then caused to move forward thereby pulling the front end of the trailer forward, which movement causes the arms 16 to swing rearwardly thereby rocking shaft 15, to release the brakes and also causing the front end of the trailer to be lowered into position for the pin or stud 14 to again engage in the socket 13. The arms 16 are then rocked upwardly into retracted position and the tractor with the trailer attached thereto is free to proceed on its way. In order to hold the arms in proper relation on the ends of shaft 15, I provide steel straps 30 which are mounted on the ends of the shaft 15 outside the side members of the trailer frame, and which embrace the upper or pivoted ends of said arms, being clamped in place by nuts 31, mounted on the ends of the shaft 15. This arrangement secures a desirable tension on the arms.

While I have described a specific structure I wish it to be understood that many changes and variations in the details may readily occur to persons skilled in the art and still fall within the spirit and scope of my invention; I do not desire, therefore, to be limited to the exact details shown and described. But

What I claim as new and useful, and of my own invention, and desire to secure by Letters Patent is,—

1. The combination with a tractor, of a trailer detachably connected thereto, brake mechanism for the trailer and means to apply the brake mechanism coincidently with the detachment of the trailer from the tractor.

2. In a traction machine, a tractor, a trailer, detachable connection between the tractor and trailer, a brake mechanism for the trailer, means to automatically detach the trailer from the tractor, said means operating to apply said brake mechanism.

3. In a traction machine, a tractor having a pin or stud, a trailer having a member at the front end thereof to detachably engage said pin or stud, supporting wheels for the rear end of the trailer, a brake mechanism for said wheels, and a supporting leg hinged to the front end of the trailer and connected to said brake mechanisms.

4. In a traction machine, a tractor, a trailer detachably connected thereto, supporting wheels for the rear end of the trailer, supporting legs hinged to the front end of the trailer, and connections between said legs and brake mechanism to apply the brake mechanism when said legs are rocked into supporting position.

5. In a traction machine, a tractor, a trailer detachably connected thereto, supporting wheels for the rear end of the trailer, supporting legs hinged to the front end of the trailer and connected to the brake mechanism to apply the latter when said legs are moved into supporting relation with respect to said trailer, said legs also operating, when moved into supporting relation to the trailer, to detach the trailer from the tractor.

6. In a traction machine, a tractor, a trailer detachably connected thereto and having supporting wheels at its rear end, a shaft mounted at the front end of the trailer and carrying swinging supporting legs, to rock into and out of position to form a support for the front end of the trailer, brake devices for said wheels, connections between the brake devices and said shaft whereby when said legs are moved into position to form a support for the trailer said brake devices are applied, said movement of the legs also operating to detach the trailer from the tractor.

7. In a traction machine, a tractor, a trailer detachably connected thereto, and having supporting wheels at its rear end, a shaft carried at the front end of the trailer and having its ends extended beyond the sides of the trailer, swinging legs carried by the ends of said shaft, brake devices for said wheels, connections between said shaft and brake devices to apply the latter when the legs are moved into position to form a support for the trailer, said movement also operating to detach the trailer from the tractor.

In testimony whereof I have hereunto set my hand in the presence of the subscribing witnesses, on this 6th day of February, A. D. 1915.

WILLIAM BARBER.

Witnesses:
S. E. DARBY, Jr.,
M. A. GRAEVE.